United States Patent [19]

Hendricks

[11] 4,034,032

[45] July 5, 1977

[54] METHOD FOR FOAM ENCAPSULATING LASER TARGETS

[75] Inventor: Charles D. Hendricks, Livermore, Calif.

[73] Assignee: The United States of America as represented by the United States Energy Research and Development Administration, Washington, D.C.

[22] Filed: Sept. 2, 1975

[21] Appl. No.: 609,640

[52] U.S. Cl. .................................. 264/28; 176/1; 260/32.8 R; 264/41; 264/46.4; 264/219; 428/403

[51] Int. Cl.² ................ B29D 27/04; C01B 4/00

[58] Field of Search ........... 264/42, 28, .5, 3, 219, 264/45, 3, 41, 46.4; 260/32.8 R; 176/1; 428/402, 403

[56] References Cited

UNITED STATES PATENTS

| | | | |
|---|---|---|---|
| 2,147,770 | 2/1939 | Ford | 264/219 X |
| 3,338,665 | 8/1967 | Silverman | 264/42 X |
| 3,428,584 | 2/1969 | Riley | 264/28 X |
| 3,453,215 | 7/1969 | Carnall et al. | 264/.5 X |
| 3,849,350 | 11/1974 | Matsko | 260/32.8 R X |
| 3,954,666 | 5/1976 | Marquisee et al. | 428/402 X |
| 3,985,841 | 10/1976 | Turnbull et al. | 264/28 X |

OTHER PUBLICATIONS

Lewkowicz, Irena, "Spherical Hydrogen Targets for Laser − Produced Fusion," In *J. Phys. D: Appl. Phys.*, vol. 7, 1974., pp. 661-662, (Letter to the Editor).
Hendricks, C. D. "Hydrogen Pellet Generation for Fusion Research," In *Bulletin of the American Physical Society*, Series II, vol. 19, Oct. 1974, pp. 915, 927, 963.
Calvert, Robert, Edt. "The Encyclopedia of Patent Practice and Invention Management," New York, Reinhold, c 1964, pp. 151-153.
Manjikian, S. and S. Loeb and J. W. McCutchan, "Improvement in Fabrication Techniques for Reverse Osmosis Desalination Membranes," From: First International Symposium on Water Desalination, Oct. 3-9, 1965, Washington, D.C., pp. 1-14.

*Primary Examiner*—Philip Anderson
*Attorney, Agent, or Firm*—Dean E. Carlson; Roger S. Gaither; L. E. Carnahan

[57] ABSTRACT

Foam encapsulated laser fusion targets are made by positioning a fusion fuel-filled sphere within a mold cavity of suitable configuration and dimensions, and then filling the cavity with a material capable of producing a low density, microcellular foam, such as cellulose acetate dissolved in an acetone-based solvent. The mold assembly is dipped into an ice water bath to gel the material and thereafter soaked in the water bath to leach out undesired components, after which the gel is frozen, then freeze-dried wherein water and solvents sublime and the gel structure solidifies into a low-density microcellular foam, thereafter the resulting foam encapsulated target is removed from the mold cavity. The fuel-filled sphere is surrounded by foam having a thickness of about 10 to 100 μm, a cell size of less than 2 μm, and density of 0.065 to 0.6 × 10³ kg/m³. Various configured foam-encapsulated targets capable of being made by this encapsulation method are illustrated.

7 Claims, 6 Drawing Figures

METHOD FOR FOAM ENCAPSULATING LASER TARGETS

BACKGROUND OF THE INVENTION

The invention described herein was made in the course of, or under, Contract No. W-7405-ENG-48 with the United States Energy Research and Development Administration.

This invention relates to laser fusion targets, particularly to foam-encapsulated laser fushion targets, and more particularly to a method for foam encapsulating laser targets.

Laser-induced fusion has recently joined magnetic-confinement fusion as a prime prospect for generating controlled thermonuclear power. During the past few years much effort has been directed toward the development of fusion fuel targets or capsules and laser-initiated systems for causing implosion and thermonuclear burn of such capsules. Compression of fuel capsules or targets by laser to initiate thermonuclear fusion is described in detail, for example, in an article published in Nature, Vol. 239, No. 5368, pp. 139–142, Sept. 5, 1972 entitled "Laser Compression of Matter to Super-High Densities: Thermonuclear (CTR) Applications" by J. H. Nuckolls et al, and an article published in Physics Today, August 1973 entitled "Laser-Induced Thermonuclear Fusion" by J. H. Nuckolls et al.

Recent efforts have also been directed to the fabrication of laser-fusion targets or fuel capsules compatible with laser energy and cost requirements for commercial power production, as described briefly in the above-cited Nature article and in greater detail in an article entitled "Spherical Hydrogen Targets for Laser-Produced Fusion" by I. Lewkowicz, J. Phys. D: Appl. Phys., Vol. 7, 1974. In addition, the fabrication of laser-fusion targets is discussed in an article entitled "Hydrogen Pellet Generation for Fushion Research" by C. D. Hendricks, "Production of Solid Pellets for Laser Initiated Target Plasma In BBII" by A. L. Hunt et al, and "Hollow Hydrogen Shells for Laser-Fusion Targets" by C. D. Hendricks et al, published in the Bulletin of the American Physical Society, Series II, Vol. 19, October, 1974, pages 915, 963 and 927, respectively.

The success of any laser-fusion system for the production of useful power depends critically on the production of suitable targets or fuel capsules which must satisfy a number of requirements in addition to low fabrication cost. Of critical importance to achieving sufficiently high energy gain are the effects of plasma instabilities, fluid instablities, and the symmetry of the implosion. Thus, the target must have characteristics such as material composition, structure, and surface finish which are compatible with the laser pulse length, energy, peak and average power, and pulse shape.

The initial phase of a laser-driven implosion is the formation of an atmosphere surrounding the target, and thus efforts have been directed to various target configurations which are capable of producing this atmosphere, as well as other means such as gas injection, ablating of the explosive-chamber wall surfaces, etc., which produce a desired atmosphere about the target or fuel capsule. Copending U.S. patent application Ser. No. 609,841 filed Sept. 2, 1975 entitled "Laser-Fusion Targets for Reactors"; and Ser. No. 609,639 filed Sept. 2, 1975 entitled "Foam Encapsulated Targets", each assigned to the assignee of this application, exemplifies laser target configurations capable of producing the desired atmosphere.

Formation of low density foams and encapsulation of microspheres and fillers therein are known in the art, as exemplified by U.S. Pat. No. 3,849,350 issued Nov. 19, 1974.

Conventionally known foams, such as polystyrene, polyurethane, polyethylene, etc., can be obtained in low densities between 0.01 and $0.1 \times 10^3$ kg/m$^3$. However, the cell size is generally too large, 25 to 800 $\mu$m, to meet the requirements for foam-encapsulated laser targets which require a foam having both low density and cell size of less than 10 $\mu$m, preferably less than 2 $\mu$m. Thus, a need has existed in the prior art for a low density, very small cell size foam and method of encapsulating fusion fuel therein.

Copending U.S. pat. application Ser. No. 609,641, filed Sept. 2, 1975 assigned to the assignee of this application and now U.S. Pat. No. 4,012,265, describes and claims a foam which fills the above need and meets the requirements for target encapsulating foam. Also, copending U.S. Pat. application Ser. No. 609,642, filed Sept. 2, 1975 assigned to the assignee of this application, describes and claims an extrusion method for fabricating foam-encapsulated laser targets utilizing the foam of said application Ser. No. 609,641 and now U.S. Pat. No. 4,012,265. The target produced by the extrusion process which produces a fine stand of foam containing fusion fuel-filled shells or spheres distributed along its length have been satisfactory, with laser illumination thereof varifying the effectiveness of the foam for its intended use in the implosion process. However, the foam strand must be scanned under a microscope to locate the individual spheres and cutting of the foam strand at the required distances from the spheres. Thus, in view of the very small size of the spheres, 40–50 $\mu$m in diameter, for example, many of the spheres can be missed during scanning, with the resultant recovery rate of usable targets increasing the time and expense of the targets due to a large extent to the selecting of properly configured spheres or shells and filling of same with the fusion fuel, such as DT, prior to the foam encapsulation process which additionally increases the time and expense involved.

SUMMARY OF THE INVENTION

The present invention is a relatively simple method for making foam-encapsulated laser targets and substantially reduces the loss of fusion fuel-filled shells or spheres, thereby resulting in a higher recovery of usable targets and a corresponding reduction in the time and expense of fabricating the targets. Briefly, the method consists of positioning a fusion fuel containing shell or sphere with a mold cavity configured to produce the desired shape and dimensions, filling the cavity with a foam-producing solution of cellulose acetate dissolved in an acetone-based solvent. The sphere/mold assembly is subjected to ice water which gels the solution and then soaked in a water bath to leach out impurities or undesired components of the gel, whereafter it is frozen and then freeze dried wherein water and solvents sublime and the gel structure solidifies into a low-density microcellular foam containing the fuel-filled sphere or shell, after which the foam-encapsulated target is removed from the mold cavity.

Therefore, it is an object of this invention to provide a method for producing foam encapsulated laser targets.

A further object of the invention is to provide a method for foam encapsulating laser targets containing fusion fuel.

Another object of the invention is to provide a method for encapsulating a quantity of fusion fuel in foam having a low density and a cell size of less than 10 μm.

Another object of the invention is to provide a method for foam encapsulating laser-fusion targets with the foam having a thickness of 10 to 100 μm, a cell size of less than 2 μm, and a density of 0.065 to 0.6 × $10^3$ kg/m$^3$.

Another object of the invention is to provide a foam encapsulation method for laser targets using a mold configured in the shape and dimensions of a desired target, wherein a fusion fuel-containing member is positioned within the mold cavity, the cavity is filled with a foam-producing cellulose acetate solution, the mold is subjected to an ice water bath to gel the solution, soaked in a water bath to purify the gel, whereafter the fuel containing gel is frozen and freeze-dried and removed from the mold cavity.

Other objects of the invention will become apparent from the following description and accompanying drawings:

DESCRIPTION OF THE INVENTION

Figure 1:
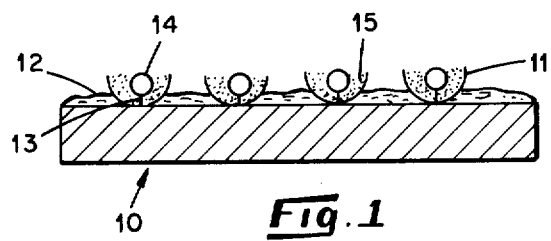
FIG. 1 illustrates an open mold assembly embodiment for carrying out the invention composed of shaped members secured to a substrate.

The present invention is directed to a method for encapsulating a quantity of thermonuclear fuel in a low density, microcellular foam having a cell size of 2 μm or less to produce laser fusion targets. While the fusion fuel is illustrated and/or described as being deuterium-tritium (DT) contained in hollow glass shells or microspheres, the foam encapsulation method of this invention can be utilized to encapsulate other types of fuel containing members or capsules.

As pointed out above, inasmuch as the known low density fine cell size (microcellular) foam had a cell size of about 25 μm, such could not be utilized to encapsulate D-T filled, hollow glass microspheres or shells to produce laser targets, for example, since implosion and electron conduction requirements therefor call for an encapsulating foam layer, for example, having a 10 to 60 μm thickness, a density of 0.1 × $10^3$ kg/m$^3$, a cell size of 2 μm or less, and a chemical composition of low average atomic number. To achieve both low density and cell size in the same foam to meet the requirements for laser targets, a phase-inversion technique was used to produce the cellular structure of the encapsulating foam utilized in this invention, such foam being described and claimed in the above-referenced application Ser. No. 609,641 and now U.S. Pat. No. 4,062,265. As pointed out in said referenced application, phase-inversion processes to make low-density microcellular foams have been used in making asymmetric, reverse-osmosis membranes for water desalination. However, the method and solution formulations for making the foam differ substantially from those used for making the membranes.

While the foam per se or process of producing same does not constitute part of this invention, the process is carried out during the encapsulation method of this invention, and thus the basic procedure for making the foam will be described. This procedure consists of making the cellulose acetate foam having the required low density and small cell size by dissolving a polymer in a solvent system consisting of a good solvent, a swelling agent, and a non-solvent. This solution is either inserted in a configured mold, which is then dipped into ice water (0°–10° C) to gel the polymer, or it is extruded from a small cross-section orifice directly into the ice water, as in the extrusion encapsulation process of said application Ser. No. 609,642. The polymer gels in the ice water, which is a nonsolvent for cellulose acetate, and the solvent and swelling agent diffuse out of the polymer gel. After soaking in the water bath for a period of time (water temperature of 0°–30° C), the polymer gel is frozen in liquid pentane (−70° to −80° C) and transferred to a freeze-drying chamber. Water and solvents sublime during freeze-drying, and the gel structure solidifies into a low-density, very fine cell size foam.

The formulation of the solution used in the foam encapsulation method of this invention is, for example:

6.0 grams cellulose acetate, Eastman E-4655,
10.0 grams magnesium perchlorate, anhydrous,
30. grams water,
15.0 grams ethyl D-L lactate,
39.0 grams acetone The cellulose acetate, Eastman E-4655, made by the Eastman Chemical Products Co., is a high viscosity polymer of about 17 Pa's, which has been substituted to 39.4% acetyl and contains 3.8% hydroxyl. This specific polymer is used herein to maintain a high viscosity in dilute solutions. The polymer concentration is a primary variable in controlling the density of the final form. Cellulose acetate concentrates have been varied from 3 to 22% in tests carried out with the density varying from about 0.065 to 0.6 × $10^3$ kg/m$^3$.

The next two components in the solutions formulation, magnesium perchlorate and water make up the swelling agent and non-solvent respectively. While the exact mechanisms of these components' interactions with the polymer and each other are not clearly understood, they are needed to make porous polymer gels. If they are not used, only full-density films can be fabricated. As the magnesium perchlorate concentration in the swelling agent increases, the amount of water incorporated into the polymer gel increases (to a limit) and thus reduces the ultimate foam density. This is due to the Mg++ ions, which hydrate the water present. It has been shown by tests that the Mg++ ions are not strongly bound to the cellulose acetate gel since soaking the polymer gel in the water bath will reduce the $Mg^{++}$ion concentration.

The acetone and ethyl lactate in the above formulations are solvents for cellulose acetate. They were chosen to meet requirements of the phase-inversion and extrusion processes. For phase inversion to take place and yield microcellular gels, the solvents must be miscible with each other and soluble in water. Also, the solvents must diffuse out of the polymer gel readily into water, and any residual solvents must come out on freeze-drying without changing the size or shape of the frozen gel. This is important because in the encapsulation process the amount of time the gel can soak in water to allow the solvents to diffuse out is 24 hours or less. This means that some residual solvent may remain in the gel and must be removed at low temperatures during the freeze-drying process. Therefore, the solvents must have high vapor pressures at low temperatures. The "D-L" in the ethyl lactate composition as identified above indicates that this is a mixture of both the D form and L form of ethyl lactate.

Another very important variable in achieving foams with the desired properties is the temperature of the water bath into which the solution containing mold is dipped. To get foams with cell sizes in the desired micrometer range requires that the polymer solution be gelled in water of 0°–10° C. Gels produced at 0° C are opalescent while gels produced from the same solution at 25° C are opaque. The opalescent gels have a submicroscopic structure and are called ultragels. The opaque gels have pore structures that are discernible under a microscope and are called microgels. Foams produced from ultragels are preferable in the encapsulation method because they are translucent to light, while microgel foams are opaque to transmitted light, and thus positive location of the fuel within the foam, when required, is more easily accomplished. The water temperature during the soaking time (16-24 hours) of the gel may be from 0°–30° C, provided, of course, that the water bath was initially at 0°–10° C to gel the solution.

To encapsulate fusion fuel-containing members, such as hollow glass shells containing DT, in low-density, fine cell foam having cell sizes ranging from 0.3 $\mu$m to 2 $\mu$m, thereby forming the desired laser targets, the following operational sequence is carried out using an exemplary solution:

1. Dissolve 6.0 grams of Eastman E-4655 cellulose acetate in solution composed of 10.0 grams magnesium perchlorate, anhydrous, 30.0 grams water, 15.0 grams ethyl D-L lactate, and 39.0 grams acetone at a temperature of 25° to 50° C.

2. Position D-T filled glass shells in each configured cavity of the mold assembly, described in detail hereinafter with respect to FIGS. 1-3.

3. Fill each cavity with the cellulose acetate solution formed by step 1 above.

4. Dip the cavity filled mold assembly into a water bath maintained at 0°–10° C causing the cellulose acetate solution to gel.

5. Soak the cellulose acetate gel containing mold assembly in the water bath at temperatures of 0°–30° C for time periods of 16 to 24 hours to provide sufficient time for the solvents and swelling agent to diffuse out of the gel.

6. Freeze the thus soaked gel containing mold assembly in −70° to −80° C liquid pentane. This step requiring a time period of a few minutes to less than 5 hours, depending on the thickness of the gel and type and size of the mold assembly.

7. Freeze-dry (4 to 8 hours depending on thickness) wherein water and solvents sublime and the gel structure solidifies into low density microcellular foam.

8. Remove the foam encapsulated fusion fuel targets from the mold assembly.

Figure 4:
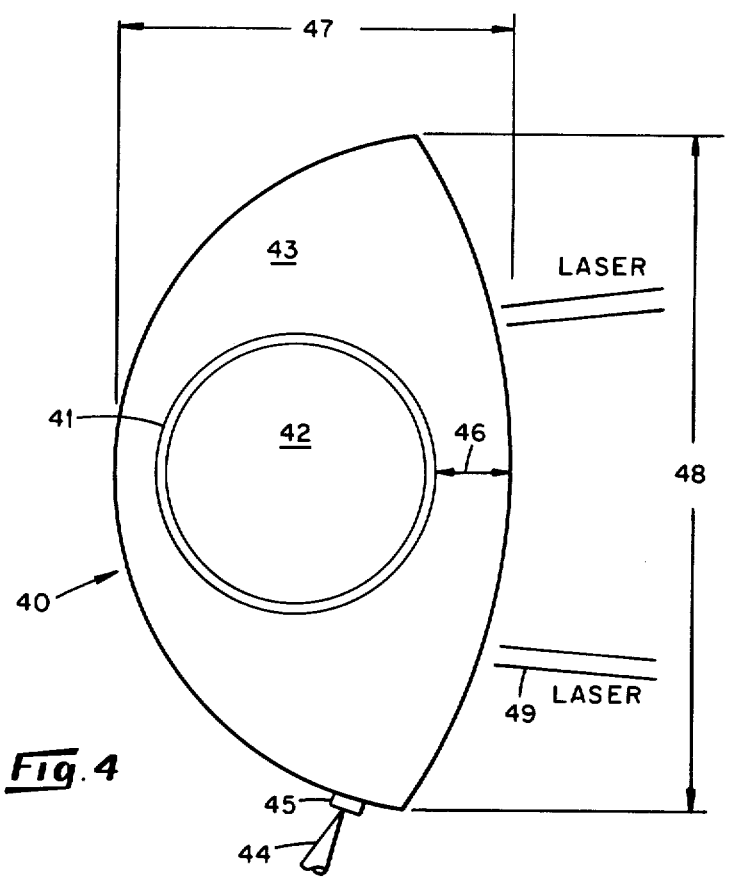
FIG. 4 illustrates a near-hemispherically shaped foam encapsulated target formed by a mold assembly similar to the embodiments of FIGS. 1 and 2.
Figure 5:
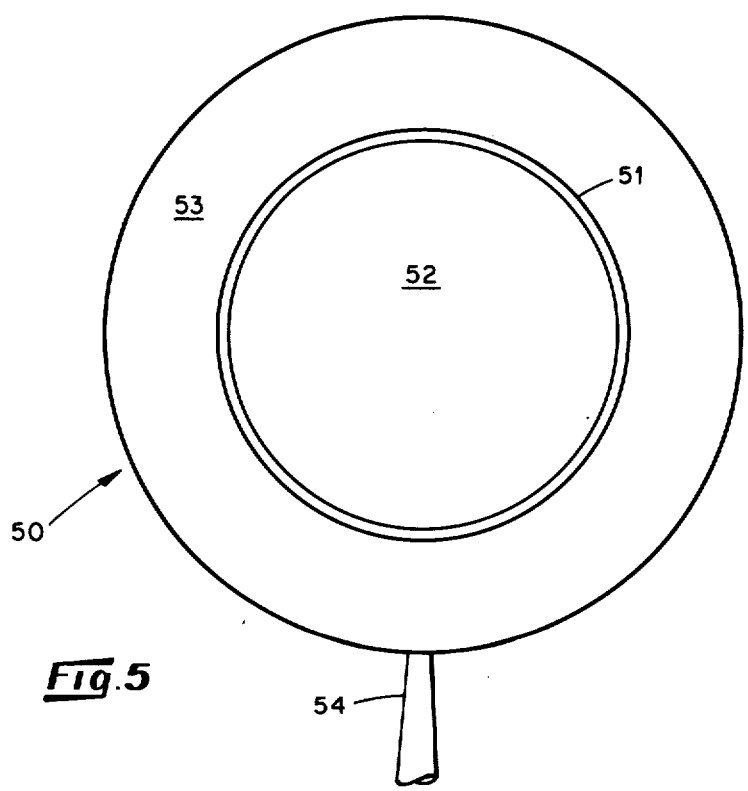
FIG. 5 illustrates a spherical foam encapsulated target formed by a closed mold assembly similar to FIG. 3.
Figure 6:
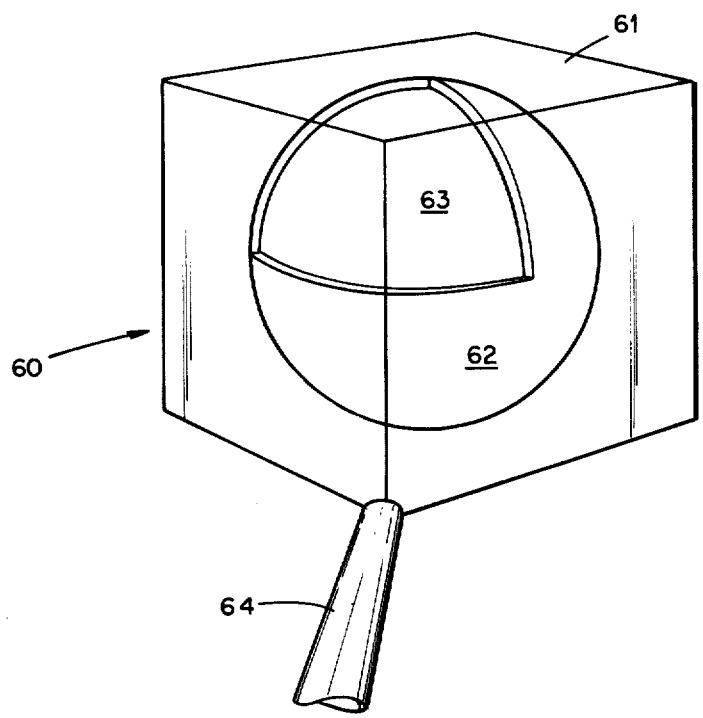
FIG. 6 illustrates a cube-shaped foam-encapsulated target capable of being formed by either open or closed mold assemblies similar to the FIGS. 1-3 embodiments but with a cavity configured to form a cube.

9. Attach, where applications require, supports or stalks, such as illustrated in FIGS. 4-6, to the targets by gluing or otherwise securing the stalks to the foam.

Figure 2:
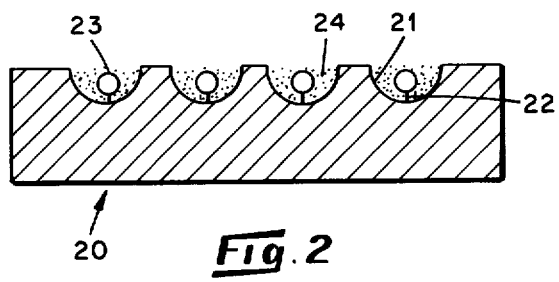
FIG. 2 illustrates an open mold assembly embodiment similar to FIG. 1 except the shaped members are formed in the substrate.
Figure 3:
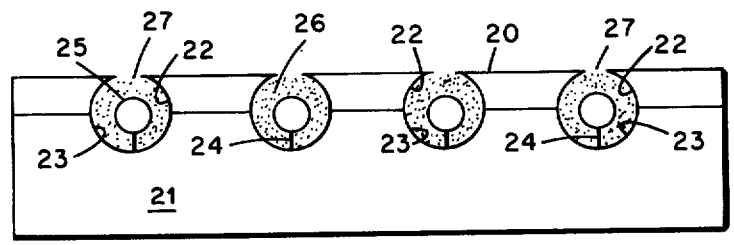
FIG. 3 illustrates a closed mold assembly embodiment for carrying out the invention utilizing removable sections, with the clamping means therefor omitted for clarity.

Referring now to the drawings, FIGS. 1-3 illustrate embodiments of mold assemblies for carrying of the method of this invention, the FIGS. 1 and 2 embodiments being of the open type, while FIG. 3 illustrates a closed type assembly. It is pointed out that the mold assembly embodiments are merely illustrative of apparatus that can be utilized for foam encapsulating laser fusion targets, and various other configurations, mechanisms, etc., can be utilized and the illustrations are not intended to infer limitations of the foam encapsulation method to any specific type of mold assemblies.

FIG. 1 illustrates an embodiment of an "open" mold assembly comprising a substrate 10 having a plurality of cavity forming hemishells 11 secured thereto by holding material 12, such as glue, epoxy, etc., the hemishells 11 being provided with at least one support member or spider 13 of glass, plastic or other suitable material upon which a DT filled hollow glass shell 14, for example, is positioned for encapsulation by foam 15, as described above. The substrate 10 may constitute a glass or plastic slide, metal plate, etc. which is compatible with the water bath and can withstand the freezing and freeze-drying operations. The hemishells 11 may be constructed of glass or plastic. As with the substrate 10, the hemishells 11 and holding material 12 must be compatible with the environment involved in the foam encapsulation operational sequence. Inasmuch as the diameter of the target produced by the mold assembly may be from about 50 to 200 $\mu$m, with the form having a thickness of 10 to 100 $\mu$m, for example, the dimensions of the FIG. 1 components are substantially enlarged for clarity. Due to the small size of the hemishells 11, such have been cut with a laser from hollow glass microspheres having the desired inside dimensions, and have also been made by lapping hollow microspheres with diamond dust so as to cut away the upper half of the sphere.

FIG. 2 illustrates a mold assembly of the open type composed of a substrate 20 having hemispherical cavity or indentations 21 machined or cast into the metal or plastic substrate. The cavities 21 are provided with spiders or support members 22 upon which fusion fuel-filled shells 23 are positioned for encapsulation by foam 24.

FIG. 3 illustrates an embodiment of a "closed" or "split" type mold assembly constituting upper and lower mold members 20 and 21, secured together by means, not shown, within which indentations or cavity sections 22 and 23, respectively, are formed to define a spherical cavity configuration. Each of cavity sections 23 are provided with a support member or spider 24 upon which is positioned a fuel containing sphere 25 for encapsulation by foam 26, which is formed by the above-described operational sequence by inserting the polymer solution into the cavity via openings or apertures 27 in each of cavity sections 22. Opening 27 provide contact between the polymer solution and the water bath. Upon completion of the encapsulation method, the mold member 20 and 21 are separated and the spherically configured laser target is removed. The materials, dimensions, etc. of the FIG. 3 assembly may be similar to those described above with respect to FIGS. 1 and 2.

The spiders or support members may be permanently secured in the mold cavities and thus leaving a small hole in the targets as they are removed therefrom, or the spiders may be removably mounted in the mold cavities and become part of the targets as they are removed from the cavities.

While hemispherical and spherical target configurations have been illustrated in the mold assemblies, other configurations such as cylindrical, rectangular, cubical, etc. may be formed by providing the mold assemblies of FIGS. 1-3 with appropriately configured cavities.

FIGS. 4-6 illustrate enlarged views of foam encapsulated targets which can be made by the method of this invention. While each of these targets are provided with a stalk or support member for test applications, such may be omitted where mounting requirements do not exist, such as when sperphical targets, for example, are dropped into a chamber for illumination by laser beams.

FIG. 4 illustrates a near hemispherically configured foam encapsulated laser target indicated generally at 40, formed by a mold assembly similar to FIGS. 1 and 2, and comprising a hollow shell or pusher layer 41 containing fuel 42, encapsulated in foam 43 and secured to a stalk or support 44 as indicated at 45. For example, shell 41 is constructed of glass having an outer diameter of 44 $\mu$m and wall thickness of 0.6 $\mu$m, fuel 42 is composed of DT having a density of $2 \times 10^{-3}$ gm/cm$^3$, foam 43 is composed of cellulose acetate having a density of $8 \times 10^{-2}$ gm/cm$^3$ with a cell size of less than 2 $\mu$m. Foam 43 is configured such that dimension 46 is 10 $\mu$m, dimension 47 is 60 $\mu$m, and dimension 48 is 90 $\mu$m. Stalk 44 is of silica with a cross-section less than 2 $\mu$m at the point of contact with foam 43. The target 40 is illuminated by a laser beam 49 as indicated by legend. For purpose of description, the following parameters illustrate a test of the FIG. 4 target:

| | |
|---|---|
| Laser Energy | = 18.0 Joules |
| Energy Absorbed | = 2.8 Joules |
| Laser Pulse Width | = 113 Picoseconds |
| Target Mass | = 23 Milligrams |
| Fuel Mass | = 0.08 Milligrams |
| Neutron Yield | = 200 |

FIG. 5 illustrates a spherically configured foam encapsulated laser target generally indicated at 50, formed by a mold assembly similar to FIG. 3, and comprises a hollow spherical shell 51, constituting a pusher, of low Z (below about 15) medium density ($\sim$ 2) material, such as glass (silica) for containment and to compress a quantity of low density fuel 52, such as DT having a density of $\sim$ 0.01 g/cc, shell 51 being encapsulated by a layer 53 of low density ($\sim$ 0.1 g/cc) fine cell size foam, in accordance with the above-described method. For standing test purposes, the target 50 is mounted on a stalk or support 54 of silica, for example, which supports the target in an evacuated test chamber during illumination by laser energy. For example, the inner diameter of the shell 51 is about 70-80 $\mu$m with a wall thickness of about 5-10 $\mu$m and the foam layer 53 has a thickness of about 10-30 $\mu$m and an external diameter of about 90-100 $\mu$m with a cell size of about 0.3 to 2 $\mu$m, with stalk 54 having a cross-section of about 5 $\mu$m at the point of intersection with the foam layer 53.

FIG. 6 illustrates a six-sided foam encapsulated target generally indicated at 60, for illumination by six laser beams and comprises a cube of foam 61 having a hollow shell or pusher 62 centrally located therein and containing a quantity of fuel 63. Foam cube 61 is suspended at one corner thereof by a stalk or support 64 glued or otherwise secured to the foam. As readily seen the target 60 is positioned such that laser beams, not shown, may be directed onto each of the six sides of the foam cube 61 resulting in a highly symmetrical implosion of the target. By way of example, the foam cube 61 has side dimensions of 100 $\mu$m $\times$ 100 $\mu$m $\times$ 100 $\mu$m and a thickness of 10 $\mu$m from the shell 62 to the center of each side, with a density of 0.1 g/cc; the hollow shell 62 being made of silica, 80 $\mu$m in diameter and with a wall thickness of 1 $\mu$m; the fuel 63 being DT gas at a density of $10^{-3}$ g/cc; and stalk 64 being made of a glass rod with a 2 $\mu$m diameter at the point of contact.

It has thus been shown that the present invention provides a method for producing foam encapsulating laser targets having a main advantage of extrusion foam encapsulation processes in its high recovery rate of usable targets. The fusion fuel-filled shells or spheres are geometrically defined within the surrounding foam, thus substantially reducing the time and expense of producing such targets. Tests have been made using foam encapsulated targets made in accordance with this invention and the results thereof have verified the effectiveness of this method of mold encapsulation.

While particular embodiments, materials, and parameters have been illustrated or described, modifications will be become apparent to those skilled in the art, and it is intended to cover in the appended claims all such modifications as come within the spirit and scope of this invention.

What I claim is:

1. A method for encapsulating a quantity of fusion fuel in a foam having a density of about 0.065 to 0.6 $\times$ 10$^3$ kg/m$^3$, a thickness of about 10 to 100 $\mu$m, and a cell size of up to about 2 $\mu$m comprising the steps of: positioning a fusion fuel-containing member having a cross-section of about 40 to 100 $\mu$m in a mold cavity formed in a desired configuration, filling the mold cavity with a solution comprising cellulose acetate and at least a swelling agent, placing the thus filled mold cavity in a bath of water having a temperature of 0°-10° C causing the solution to gel, soaking the gel in a water bath to extract additives therefrom, freezing the thus soaked gel, freeze-drying the thus frozen gel such that water and solvents therein sublime and the gel structure solidifies into a low density microcellular foam containing the fusion fuel therein, and removing the thus formed fuel containing foam from the mold cavity.

2. The method defined in claim 1, aadditionally including the step of attaching the thus formed fuel containing foam to a support member.

3. The method defined in claim 1, wherein the step of soaking the gel in the water bath is carried out in a time period of 16 to 24 hours and wherein the bath is maintained at a temperature of 0°-30° C.

4. The method defined in claim 1, wherein the step of freezing the gel is carried out by inserting same into liquid pentane having a temperature of about −702 to −18° C.

5. The method defined in claim 1, wherein the step of freezedrying the gel is carried out in a period of 4 to 8 hours.

6. The method defined in claim 1, additionally including the step of forming the solution by dissolving a quantity of cellulose acetate in a solution composed of magnesium perchlorate, water, ethyl lactate, and acetone at a temperature of about 25° to 50° C.

7. The method defined in claim 1, additionally including the step of forming the solution by dissolving a quantity of cellulose acetate in a solution composed of a solvent, a swelling agent and a non-solvent.

* * * * *